(12) United States Patent
Ray et al.

(10) Patent No.: US 7,805,761 B2
(45) Date of Patent: Sep. 28, 2010

(54) DISPOSABLE RED PARTITIONS

(75) Inventors: Kenneth D. Ray, Seattle, WA (US);
Paul England, Bellevue, WA (US);
Nathan T. Lewis, Sammamish, WA
(US); Michael David Marr, Monroe,
WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 11/118,062

(22) Filed: Apr. 29, 2005

(65) Prior Publication Data
US 2006/0248587 A1 Nov. 2, 2006

(51) Int. Cl.
*G06F 11/00* (2006.01)
*G06F 12/14* (2006.01)
*G06F 12/16* (2006.01)
*G06F 7/04* (2006.01)
*G06F 17/30* (2006.01)
*G06F 11/30* (2006.01)
*G08B 23/00* (2006.01)
*H04N 7/16* (2006.01)
*B41K 3/38* (2006.01)

(52) U.S. Cl. .......................... 726/24; 726/26; 713/189; 380/59

(58) Field of Classification Search .................. 726/22, 726/24, 26; 713/189, 193; 380/59
See application file for complete search history.

(56) References Cited

U.S. PATENT DOCUMENTS

| | | | | |
|---|---|---|---|---|
| 5,255,211 A | * | 10/1993 | Redmond | 703/6 |
| 5,412,801 A | * | 5/1995 | de Remer et al. | 714/20 |
| 6,032,224 A | * | 2/2000 | Blumenau | 711/117 |
| 6,223,269 B1 | * | 4/2001 | Blumenau | 711/202 |
| 6,301,670 B1 | * | 10/2001 | Motoyama et al. | 713/300 |
| 6,615,365 B1 | * | 9/2003 | Jenevein et al. | 714/6 |
| 7,290,166 B2 | * | 10/2007 | Rothman et al. | 714/6 |
| 2007/0067366 A1 | * | 3/2007 | Landis | 707/205 |
| 2007/0128899 A1 | * | 6/2007 | Mayer | 439/152 |

OTHER PUBLICATIONS

Boyce, Jim, Absolute Beginner's Guide to Microsoft® Office 2003, Que, Sep. 24, 2003, Chapters 1-3.*
"A Short Guide to Partitioning a Hard Drive for a Linux system," moses, Feb. 23, 2004.*

(Continued)

*Primary Examiner*—David García Cervetti
*Assistant Examiner*—Oscar A Louie
(74) *Attorney, Agent, or Firm*—Woodcock Washburn LLP

(57) ABSTRACT

A system and method are provided, whereby data that is easily re-created is separated from data that is not easily re-created, such that the easily re-created data can be disposed of based on a variety of events and the not easily re-created data can be kept in its original state. In one aspect of the invention, such easily re-created data is disposed of based on a "panic button" being pushed by a computer system user, such as when a user becomes aware that some malware has infected the computer system. In other aspects of the invention, such data is disposed of every time the computer system boots up, or detects via its anti-virus program that some malware is present. In other aspects of the invention, the easily re-created data can be rolled back or rolled forward without affecting the non-easily re-created data.

16 Claims, 12 Drawing Sheets

OTHER PUBLICATIONS

"Linux Install—Reinstall Philosphy," hopeless case, Mar. 25, 2002.*
"PetesProjects: Backing Up Your Linux System," PetesProjects et al., Jan. 16, 2004.*
"Filesystem Hierarchy Standard," Russel et al., Filesystem Hierarchy Standard Group, 2004.*
"cronTabNoNo," Blaxell, Feb. 3, 1999.*
"Data Protection and Rapid Recovery From Attack With a Virtual Private File Server and Virtual Machine Appliances," Matthews et al., Last Modified: Oct. 3, 2005, Created: Sep. 18, 2005.*

* cited by examiner

Separating of User Data and System Data

Separating User Data and System Data In Different Compartments

Exemplary Effects of Separation of User Data and System Data

Extracting User Data From A Compartment

DISPOSABLE RED PARTITIONS

FIELD OF THE INVENTION

The present invention relates generally to the field of computing. More particularly, the present invention relates to disposing of system data that have been separated from user data.

BACKGROUND

Malware can have devastating effects, whether financial, psychological, or otherwise, on users of computer systems. "Malware" is an abbreviation of the phrase "malicious software." It is a collective noun that refers to any software on a computer system that is acting contrary to a user's wishes. Effects of malware include unauthorized copying and storing of data, violating privacy, spying, causing denial of service, destroying data, and the like. Such malware attacks not only cost computer users time and money to fix, but are also frustrating to deal with in the first place. They can undermine computers systems' performance in their more benign forms, and devastate computer systems in their more malicious forms.

Malware also comes in the form of software that is neither written for direct malicious intent, nor causes direct problems for the user. However, these kinds of malware can still have both security and financial implications for individuals or organizations. Examples of such potentially dangerous threats include spyware and adware, where the former uses other forms of deceptive software and programs that conduct certain activities on a computer without obtaining appropriate consent from the user, and where the latter often manifests itself in pop-up advertisements that can become an annoyance, and in some cases degrade system performance.

As mentioned above, malware refers to any software on a computer system that is acting contrary to a user's wishes. Thus, it would be advantageous to provide for some means to prevent to the utmost extent attacks from such malware, whether manifested in the form of viruses, worms, Trojan horses, spyware, adware, and any other mechanisms that threaten to undermine optimal computer usage. Specifically, it would be advantageous to provide a mechanism whereby infected partitions of memory (so called "red partitions") can be completely disposed of (or "torched") so that system data can be re-installed anew, but at the same time user data can be protected and kept separate from the system data so that it does not have to be re-created and re-installed.

SUMMARY OF THE INVENTION

A system and method are provided for disposing of data, including all malicious software, within a given partition. In one aspect of the invention, system data is separated off from user data, and the system data can be disposed of, or "torched," while keeping the user data intact. The separation is based on the notion that system data is easily re-creatable while user data is not, and thus, system data can be disposed of at will. That is, the system data can be disposed of by pushing a "panic button," by a timer event, by a anti-virus checker event, or any other event that sets a standard for disposal.

In another aspect of the invention, the system data can be rolled back to a previous desired state, which is a state usually just before a malware attack or accident that caused data to be lost, or other incident. Likewise, the system data can be rolled forward to a new state. The separation of user data from system data allows for efficient roll back/roll forward because it is possible to separately roll back/roll forward the easily re-creatable system data (that is more likely to contain malware or damage from malware) without rolling back/rolling forward the user data—which in turn is desirable, since the user data is not easily re-creatable.

The user data can be stored in one compartment and the system data can be stored in another compartment within a partition in a virtualized environment. The system data can then be torched without torching that user data. Moreover, the user data can be extracted from a compartment containing both the user data and the system data. Once the user data is extracted, the remaining system data can be torched. Then, the user data can be repopulated in the compartment along with new system data.

Other features of the invention are described below.

BRIEF DESCRIPTION OF THE DRAWINGS

The foregoing summary, as well as the following detailed description of the invention, is better understood when read in conjunction with the appended drawings. In order to illustrate the invention, various aspects of the invention are shown. However, the invention is not limited to the specific systems and methods disclosed. The following figures are included.

DETAILED DESCRIPTION OF ILLUSTRATIVE EMBODIMENTS

Overview

First, an exemplary computing environment is provided that may be useful in implementing various aspects of the invention. Second, a system and method is discussed where system data is separated from user data, where the former is easily re-creatable data that can be disposed of based on a variety of events, like boot time, anti-virus detection, or the pushing of a "panic button," and the latter is not easily re-creatable data that should be preserved. Separating user data from system data allows a user to dispose of system data upon a malware attack while preserving the most recent state of user data. Upon disposal, the system data can be reinstalled and used alongside the preserved user data.

Exemplary Computing Environment

Figure 1:
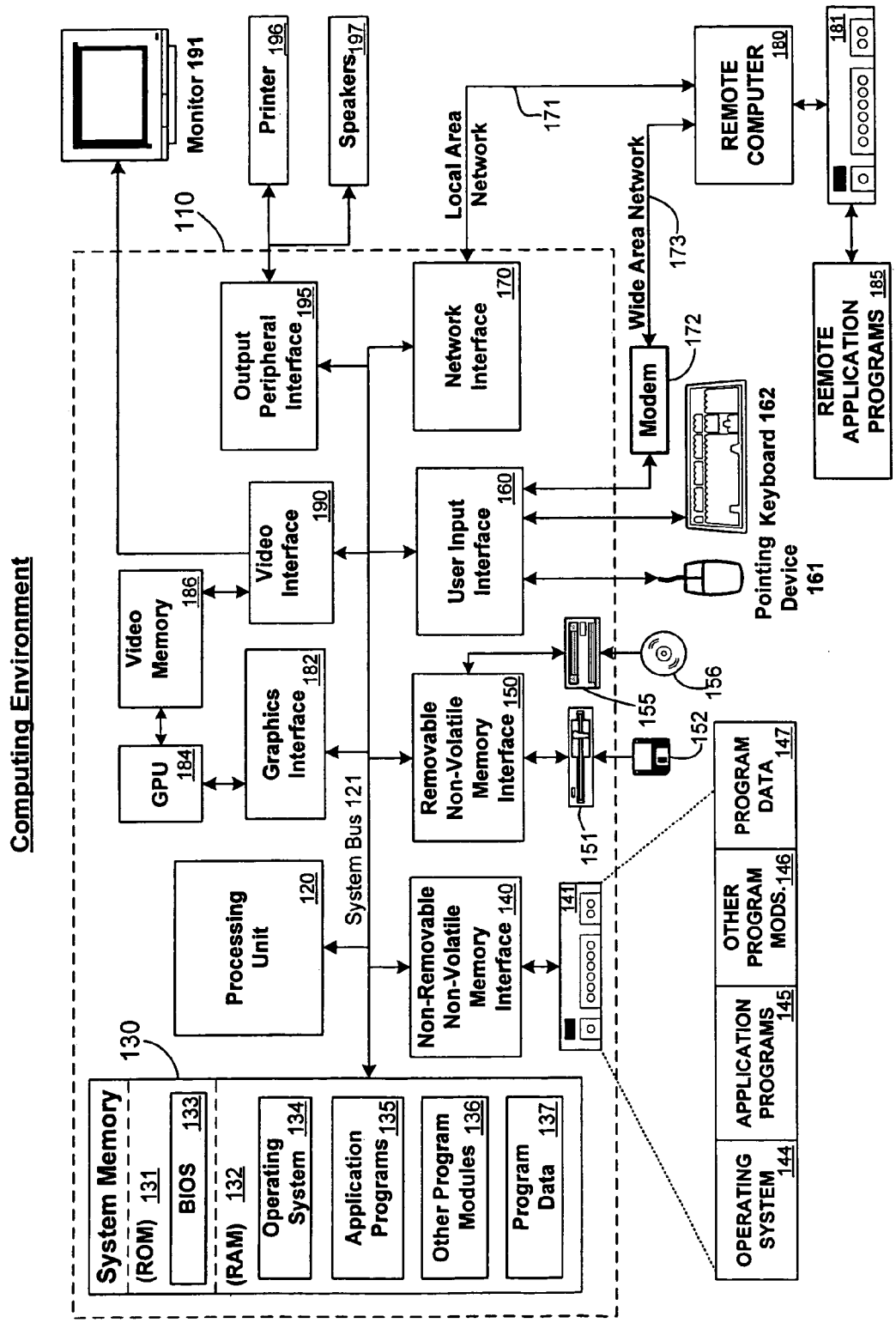
FIG. 1 provides a brief general description of a suitable computing device in connection with which the invention may be implemented.

FIG. 1 and the following discussion are intended to provide a brief general description of a suitable computing device in connection with which the invention may be implemented. For example, any of the client and server computers or devices illustrated in FIG. 1 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Aspects of Disposable Red Partitions

Figure 2A:
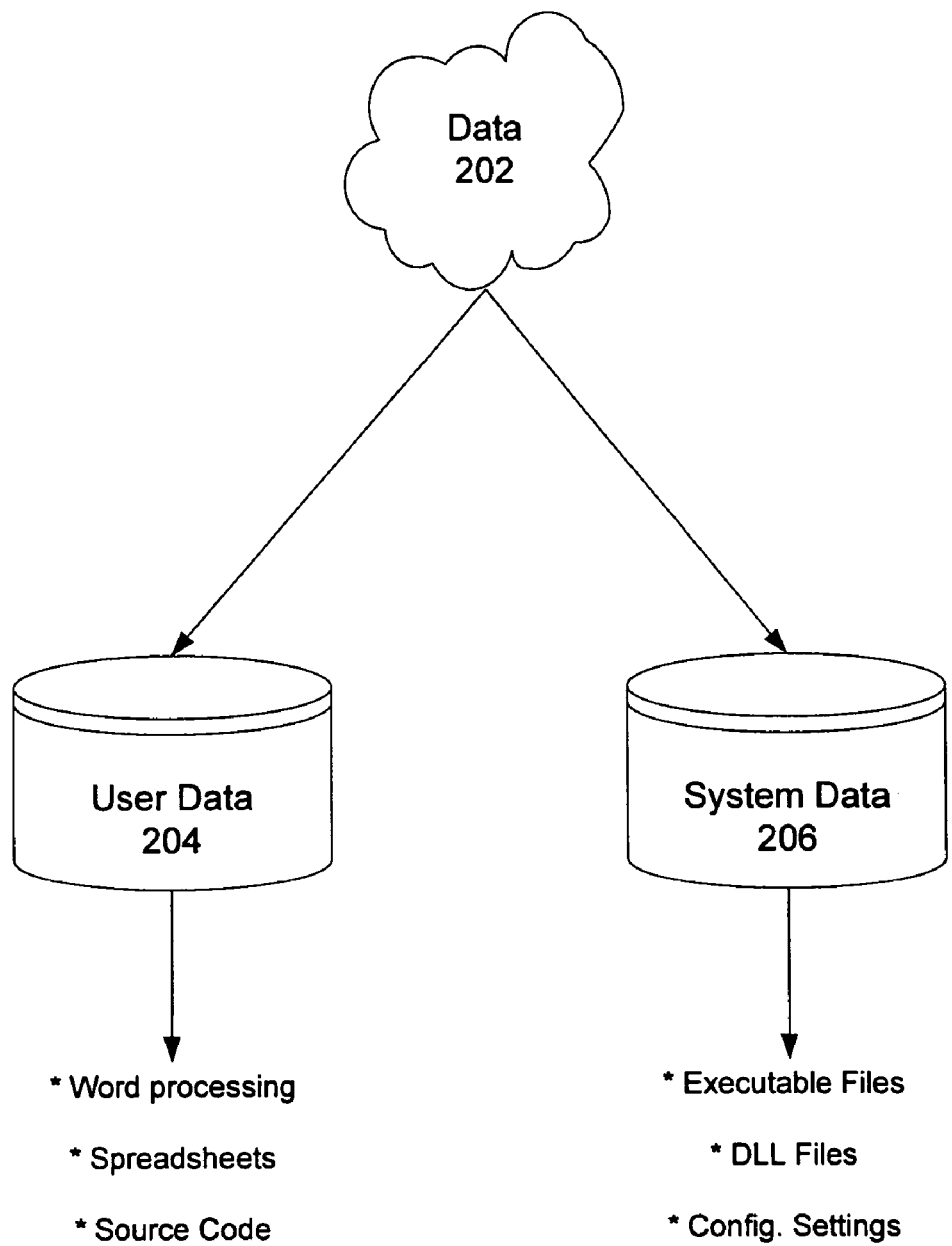
FIG. 2A illustrates the notion of separating user data from system data, in other words, the separating of easily re-creatable data from not easily re-creatable data.

FIG. 2A illustrates one aspect of the invention, where user data is separated from system data. Data 202 on a computer system can be generally classified into either user data 204 or system data 206 (The word "data" is used in a general sense herein, so that it refers to all kinds of data, which may include software, which is sometimes referred to as "code"). User data 204, generally speaking, is any data that is not easily re-created, and system data 206 is any data that is, generally speaking, easily recreated. Examples of user data 204 include word processing documents, spreadsheets, source code, and so on. Examples of system data include executable files, dynamic link libraries, configuration settings, and the like.

In short, as the name suggests, user data is data that may be unique in some manner because it is created by individual users, and is therefore not easily re-creatable. Conversely, system data is data that may be created by the industry or specific companies that have multiple copies of the system data, and hence such data is much more easily re-creatable. Thus, in FIG. 2A, user data is separated from system data according to a standard of difficulty of data recreation in these sense that depending on how difficult it may be to reproduce any given data, it will be cast either as user data or system data.

Figure 2B:
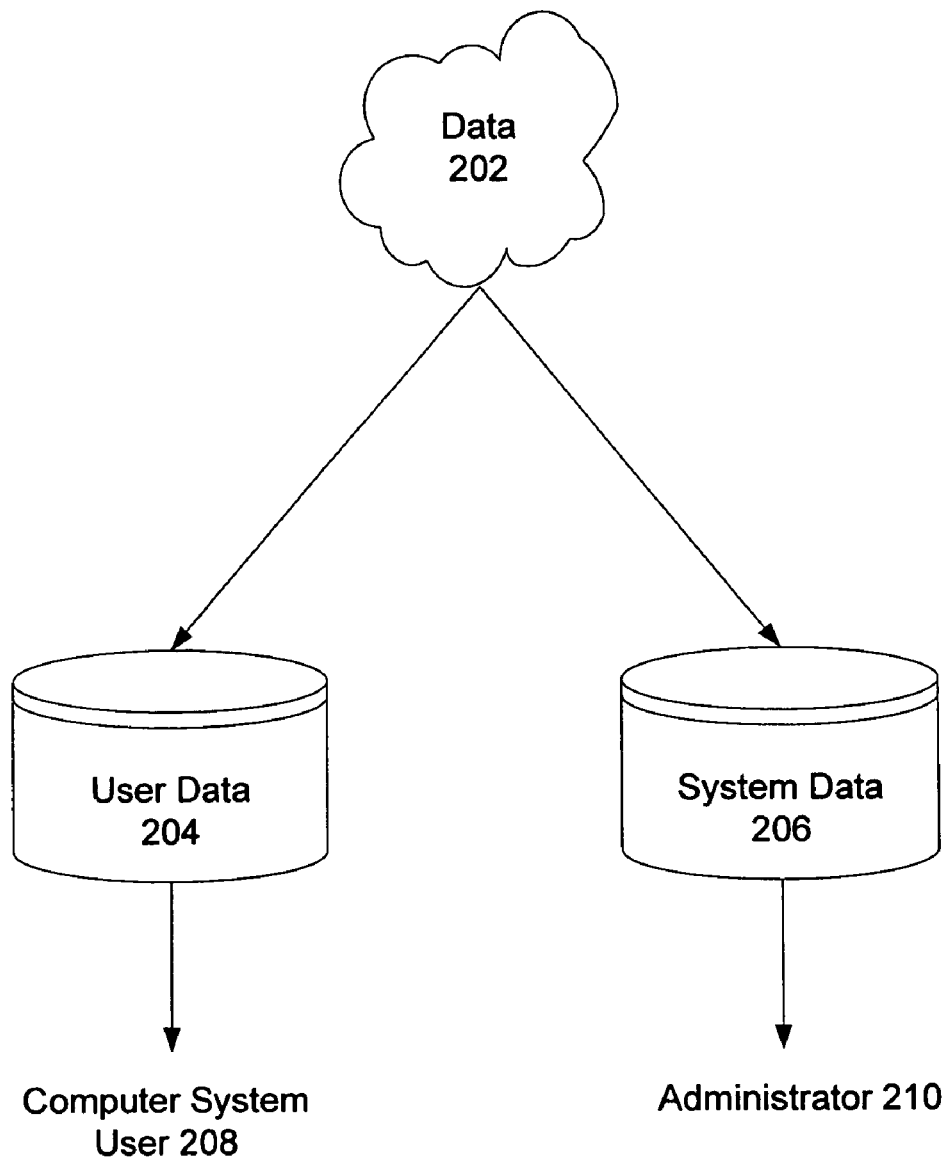
FIG. 2B illustrates the notion of separation of user data and system data and how that separation coincides with the separation of users.

On a related note, in FIG. 2B, in another aspect of the invention, the separation of data coincides with the separation of the types of users that have responsibility for the data. For example, an individual user 208 is responsible for the user data 204, and an administrator 210 is responsible for the system data 206. Because the user data 204 and the system data 206 is separated, the administrator 210 can completely dispose of the system data without fear that the not easily re-creatable user data will be compromised.

Figure 3A:
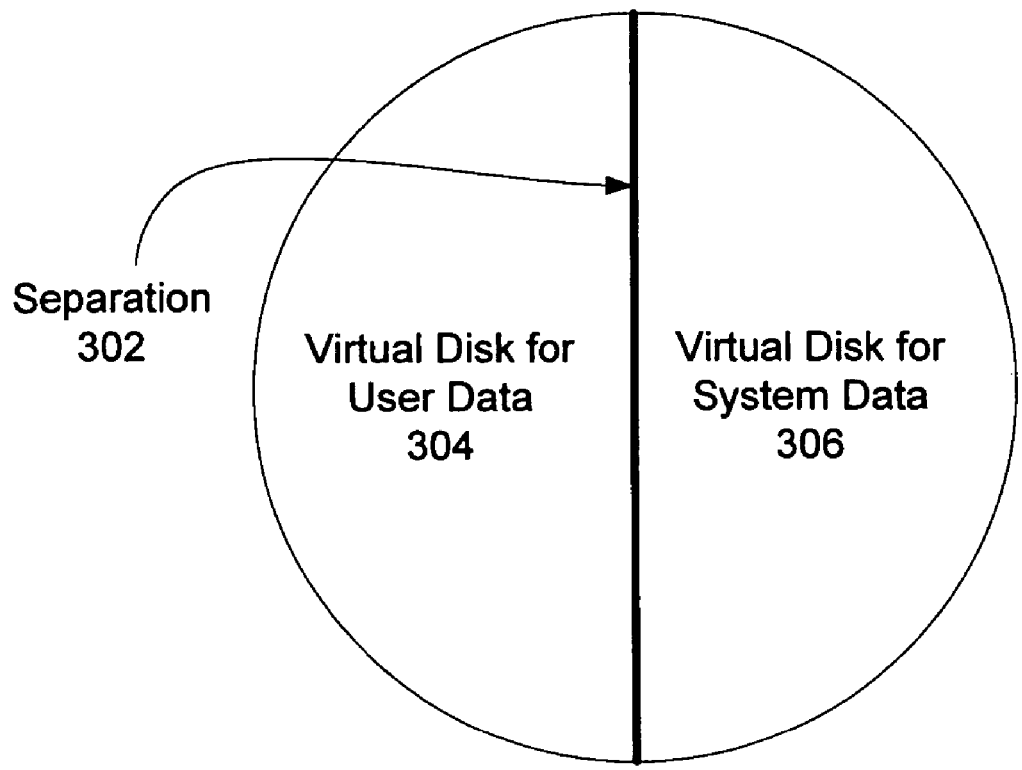
FIG. 3A illustrates the separation of user data and system data by using compartment like virtual disks.

To further illustrate another aspect of the separability of the system and user data, FIG. 3A illustrates two separate virtual disks, one of which contains user data and the other of which contains system data. Multiple virtual disks are used to separate out the virtual disk for user data 304 and the virtual disk for system data 306. The OS within a red partition (i.e., a partition that may be infected with malware) has the capability of isolating these virtual disks from each other, such that complete separation is maintained between the user data on its disk and the system data on its disk. This separation allows for the disposal of system data without necessarily disposing of user data.

Figure 3B:
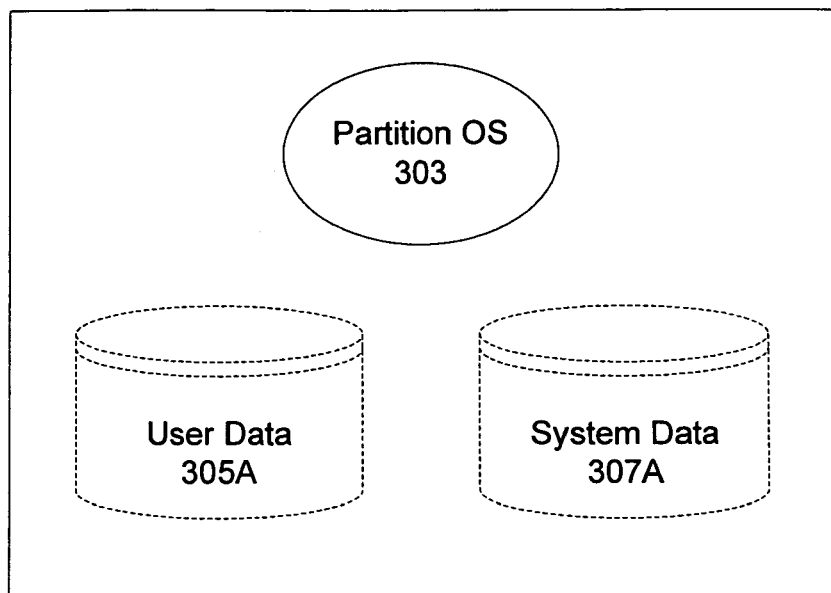
FIG. 3B illustrates the notion of user data and system data being stored in a partition and the user data being stored in one compartment like a first virtual disk, and the system data being stored in another compartment like a second virtual disk.
Figure 3B:
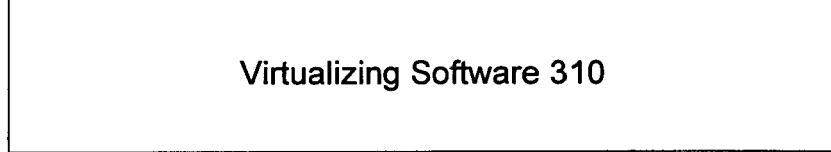
Figure 3B:
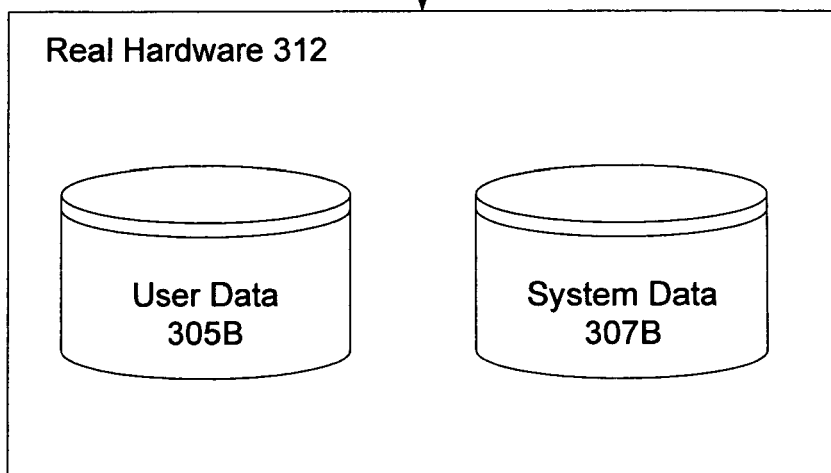

In yet another aspect of the invention, in FIG. 3B, a partition 301 is maintained by a virtualizing software 310, which virtualizes real hardware 312 to the partition 301, so that it appears to the partition OS 303 that it is operating on such real hardware. For example, a real user data compartment 305B is virtualized by a virtualizing software 310 to the partition 301 as a user data compartment 305A (the dashed lines indicate that the compartment is "virtual," as opposed to "real"—which is shown in solid lines).

Thus, the partition OS 303 maintains these two compartments, 305A and 307A, and can torch the system data in compartment 307A while maintaining the user data compartment 305A. It is this separability notion that allows the OS 303 to torch the system data 307A without torching (discarding) the user data 305A.

Figure 3C:
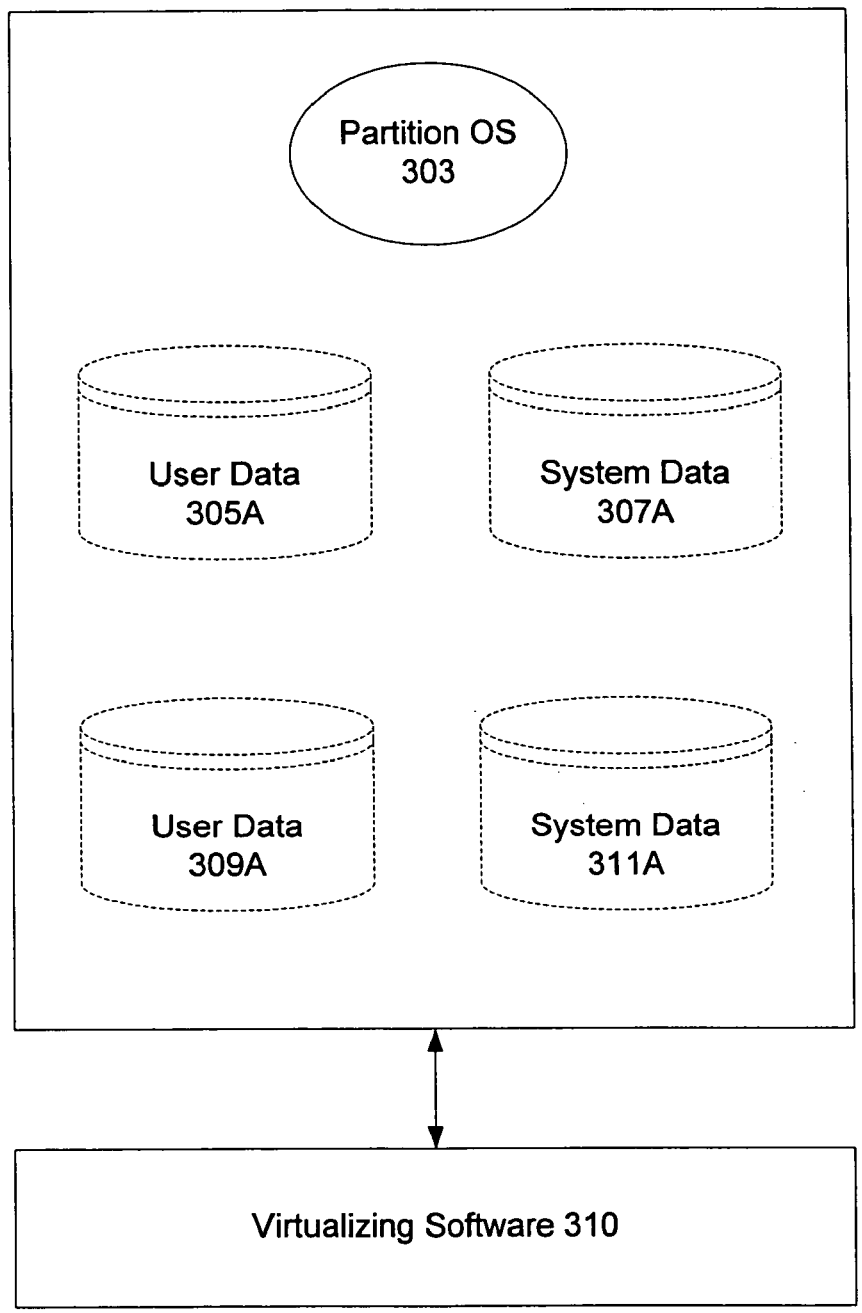
FIG. 3C illustrates that different kinds of data can be managed differently, where one type of user data can be managed in one manner and a different kind of user data can be managed in yet a different manner (the same holds true for system data)

Furthermore, in FIG. 3C, different kinds of data are managed differently. Thus, for example, there is a first user data compartment 305A and a second user data compartment 309A, and each of these two compartments can be managed differently. The same holds true for the system data. There is a first system data compartment 307A and a second system data compartment 311A and each of these two compartments can be managed differently. Moreover, each of these compartments can contain different kinds of data. For example, the system data compartment 307A can contain operating system software and the system data compartment 311A can contain applications. Similar logic holds true for the user data that can be user data of different types.

Figure 4:
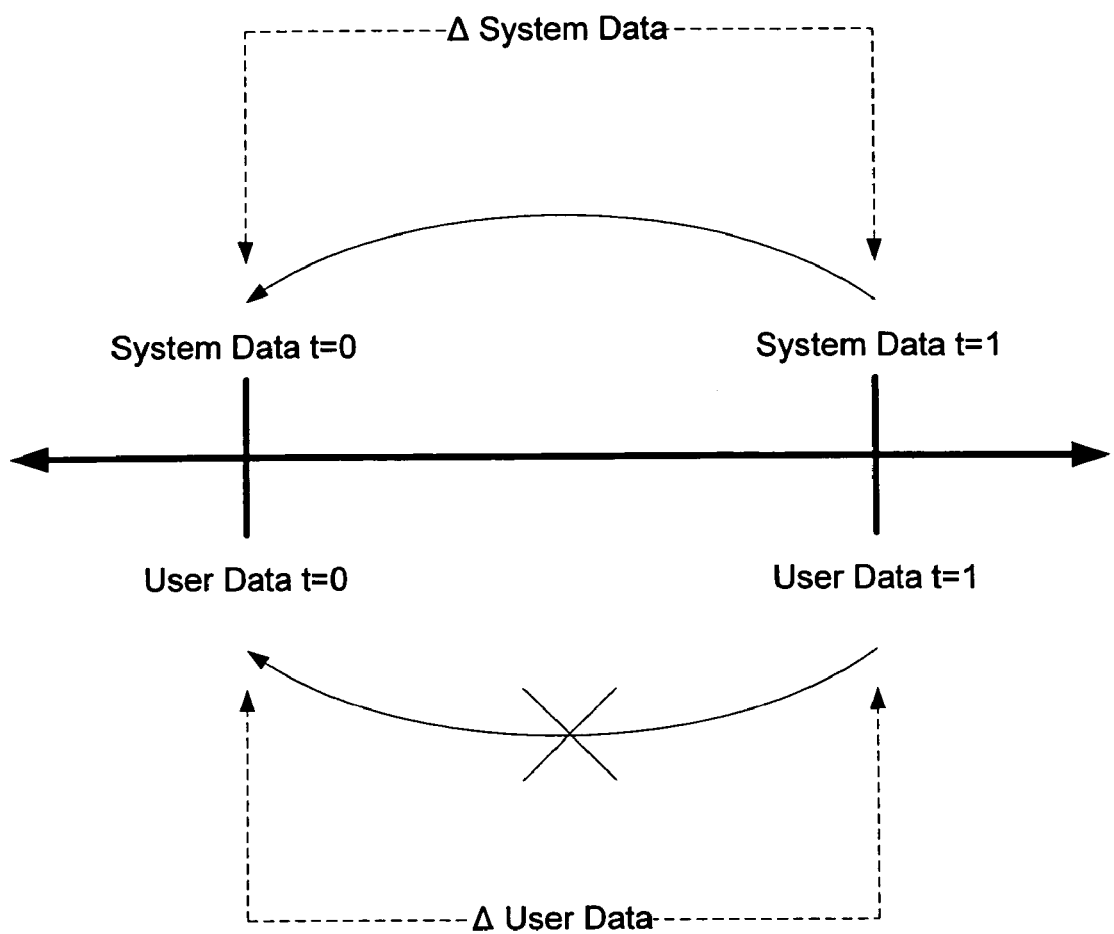
FIG. 4 illustrates the exemplary effects of the separation of user data and system data.

FIG. 4 illustrates the effect of separating the system data from the user data. In particular, FIG. 4, illustrates a time line, where user data is depicted at time t=0 and at another time, t=1. The user data is assumed to have changed between these two times, as is shown by Δ User Data. Also, the system data is depicted at time t=0 and t=1. Likewise, the system data is assumed to have changed between these two times, as illustrated by Δ System Data. Now, if some software that is acting contrary to a user's wishes starts to cause problems at time t=1, it would be desirable to go back to some previous known good state, like at time t=0.

Going back from one state, at t=1, to another state, at t=0, is not undesirable for easily re-creatable data, like system data. However, this is undesirable for non-easily re-creatable data like user data. Going back from t=1 to t=0 means that Δ User Data will be lost, and such data cannot be easily re-created. To overcome this problem, the user data is separated from the system data, such that the system data can go back from t=1 to t=0, but user data does not need to go back (hence the illustrated arrow of system data going back from t=1 to t=0, and the crossed-out arrow of user data going back from t=1 to t=0).

Figure 5:
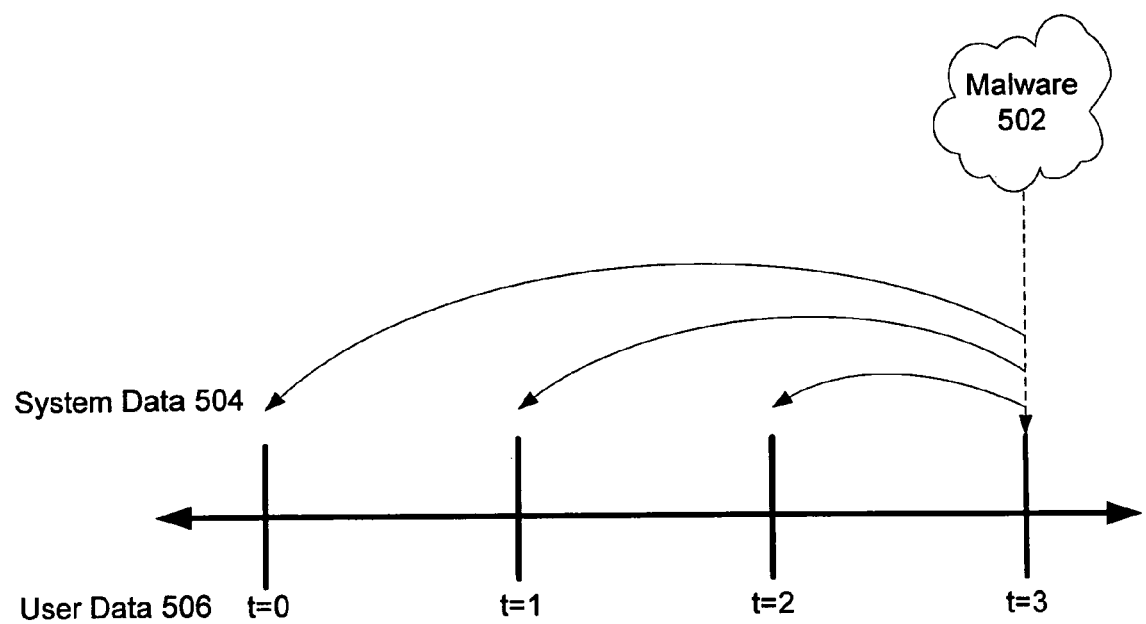
FIG. 5 illustrates the rollback of system data when it is separated from user data.

In yet another aspect of the invention, in FIG. 5, the scenario of a system data rollback is illustrated. With this kind of rollback, no user data is lost since the user data is separated from the system data. For example, at time t=3, some malware 502 attacks a computer system containing both system data 504 and user data 506. Because of this attack, infected data has to be rolled back to a known good state, which may be present at times t=2, t=1, or t=0. However, as suggested above with respect to FIG. 4, only the system data has to be rolled back. Since the user data is separated from the system data, it does not have to be rolled back.

Moreover, various events can signal a "checkpoint" (one of the place a system can roll back to, viz., t=2, t=1, or t=0). Such a checkpoint can be the place not only that a system rolls back to but also rolls forward to. The roll forward occurs when data is replaced with newer data. Thus, for example, if a system application, such as Word 97, is torched, a newer version of Word, e.g. Word 2000, can be installed.

The known good state can be established by some established procedure that can take the system data back to any of the illustrated times. For example, if a user wants to rollback the system data all the way back to the day when his computer system was bought, then the system data can be rolled back to t=0. Alternatively, if he wants to rollback the system data to a few hours before the malware 502 attack, then he can rollback to time t=2. The advantage of rolling back to t=2 instead of t=0 is that at t=2 the system data may have had some software patches installed that have made the system data more robust. Rollback in this scenario will mean that the system data at time t=3 will be completely destroyed, i.e., disposed of or "torched," and replaced with system data from a previous time, whether t=0, t=1, or t=2, depending on what the user specifies.

Moreover, the rollback does not only have to be temporal, but could instead be based on some transactional standard. For example, instead of rolling back a couple of hours or days, system data could be rolled back based on a set number of transactions. Or, alternatively, it could be based on the combination of temporal and transactional factors. Furthermore, it could be based on reboot, or user or software specification of rollback. The context in which these aspects of the invention will be employed will dictate what kind of a rollback standard will be implemented.

In another aspect of the invention, easily re-creatable data could be disposed of based on a variety of factors. For example, such data could be disposed of every time a system is shut down and re-loaded onto the system at every boot procedure. Alternatively, such data could be disposed of by pressing something equivalent to a "panic button," which could be designated by software as corresponding to a key on a standard keyboard (e.g. F12). Also, such data could be disposed of based on a computer event like a software virus scanner detecting a problem with the computer system. Upon such detection, all the re-creatable data could be automatically disposed of. Furthermore, disposing of data could be based on a timer basis, for example, every week re-creatable data could be wiped out or even every day, say, at 3 AM. In short, there are a multitude of events that could trigger the disposing of easily re-creatable data.

Figure 6:
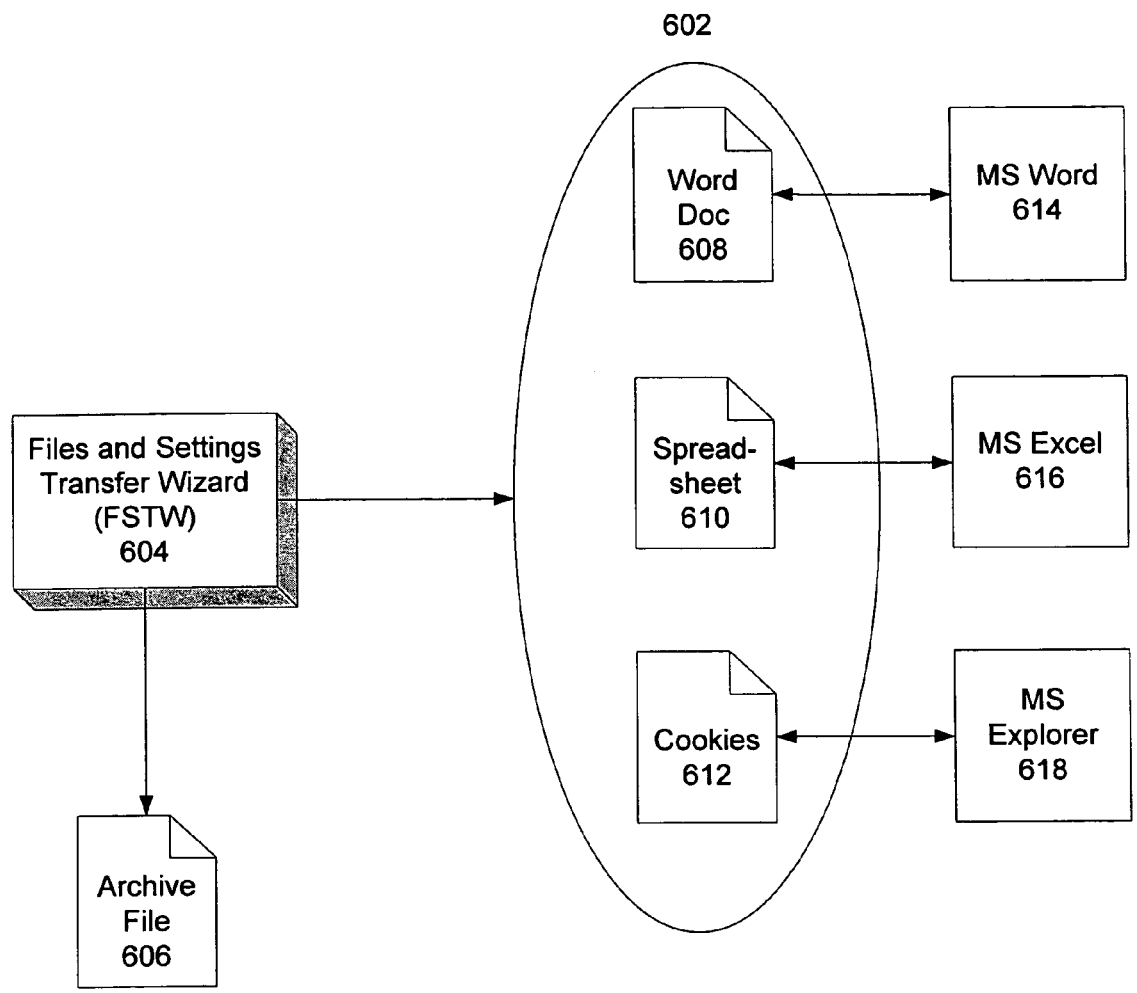
FIG. 6 illustrates the functionality of the Files and Settings Transfer Wizard.

In another aspect of the invention, in FIG. 6, a Files and Settings Transfer Wizard (FSTW) collects user data that is placed in applications all over a computer system and collects that data, places it in an archive file, and stores it in a place separate from the applications (which are representative of the system data). Next, the applications can be completely disposed of in the sense that the memory space on which the applications reside is completely wiped out or "torched"— the equivalent of formatting. The user data, however, is preserved in the archive file and does not have to be re-created. In short, the user data is taken out, preserved, and then reapplied to a new system data that is reloaded.

Thus, as is illustrated in FIG. 6, the FSTW 604 first collects 602 all kinds of unique user data associated with various user system applications. For example, it can collect 602 a Word document 608 that is associated with Microsoft Word 614, it can collect a spreadsheet document 610 that is associated with Microsoft Excel 616, or it can collect cookies 612 associated with Internet Explorer 618. Each of these user data 608, 610, and 612, is collected 602 in order to be stored in a archive file 606 and saved for later use by the user.

Conversely, the system data, namely, 614, 616, and 618, is the easily re-creatable, and so it can be disposed of or "torched." The user data saved in the archive file 606 can then be re-installed on a system with a new system data. Thus, in FIG. 6, once the MS Word 614, MS Excel 616, and MS Explorer 618 applications are disposed of—again, disposal can implemented for any of the reasons discussed above, such as the pushing of a "panic button" or at boot time—new system data can be reinstalled, that is, a new MS Word, MS Excel, and MS Explorer. By "new" system data, what is meant is any data that is different from the system data that was just disposed of. Thus, theoretically, a "new" MS Word application could be Word 97, where in fact the disposed of version was a "newer" Word 2000. Conversely, the "newer" system data could be newer version of the disposed of system data. In short, once user data is collected 602 by the FSTW 604, any desired version of the system applications may be re-deployed.

Figure 7:
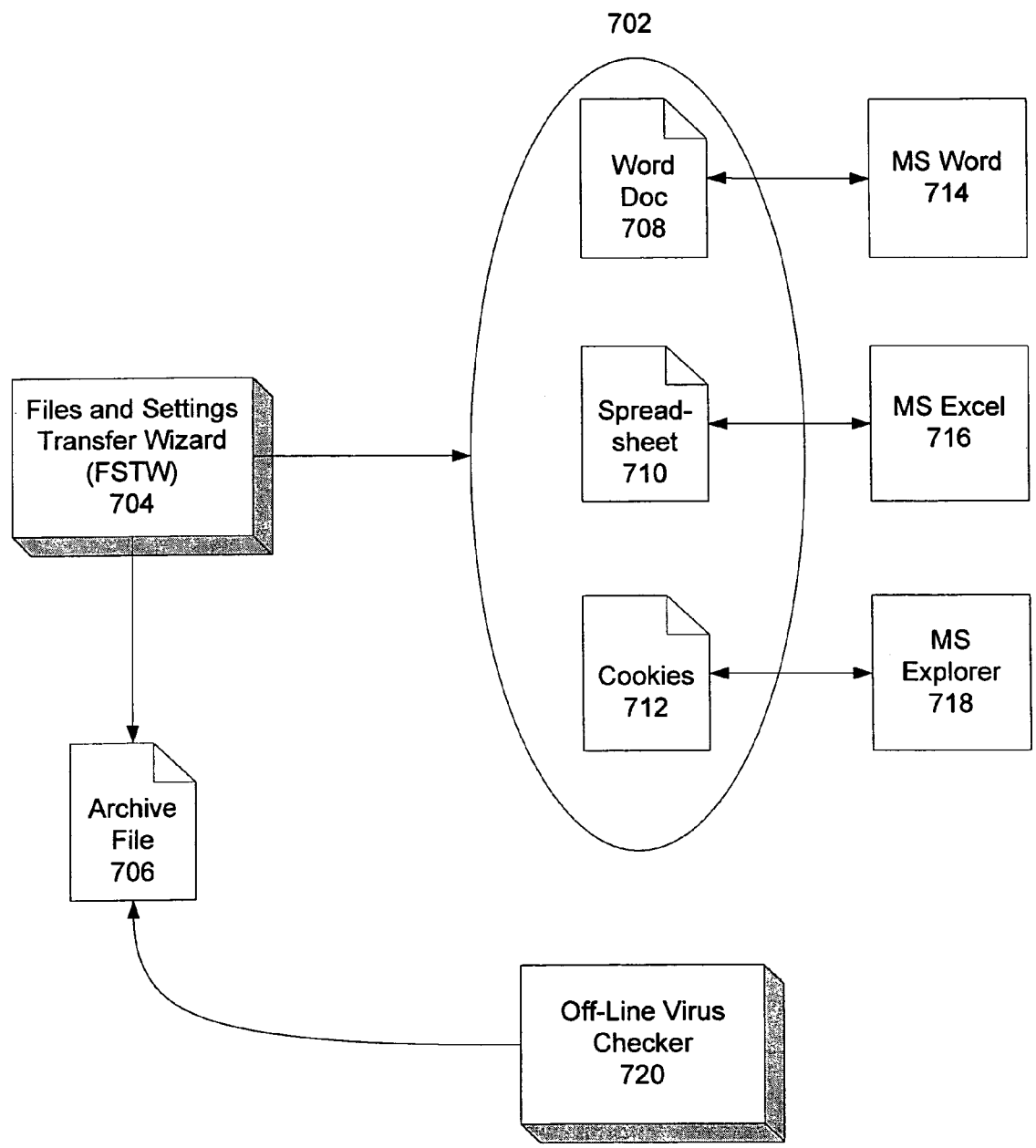
FIG. 7 illustrates an off-line virus checker for the Files and Settings Transfer Wizard.

In another aspect of the invention in FIG. 7, the archive file 606 discussed immediately above in FIG. 6, can be additionally checked with an off-line virus checker for such things as macro viruses. Thus, after the FSTW 704 collects 702 the user data 708, 710, and 712, and places it in the archive file 706, that file can be checked in case any unauthorized software has gotten through to the user data—the system data can be presumed at this point to be infected with some malware or at least an event has occurred where the system data will be disposed of—so that the off-line virus checker is an additional integrity functionality for the user data that is provided by this aspect of the invention.

Figure 8:
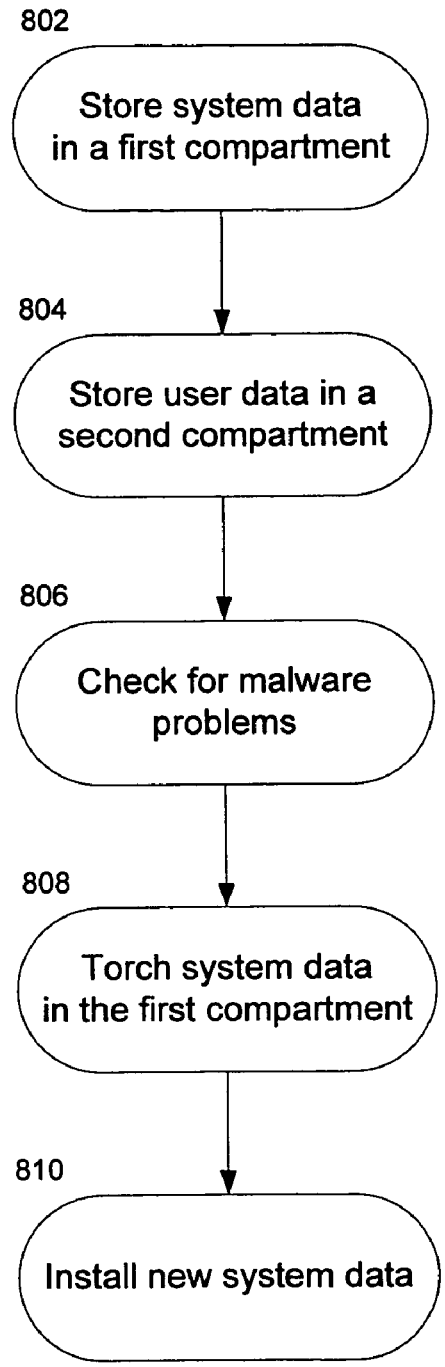
FIG. 8 illustrates an exemplary implementation of disposing of infected or "red" partitions.

FIG. 8 illustrates an exemplary block diagram implementation of the invention. At block 802, system data is stored in a first separation mechanism (or a virtual disk, or any equivalent storage device). The system data, as discussed above, includes executable files, dynamic link library files, configuration settings, and the like. The system data is easily re-creatable data because multiple copies of it exist and it can be supplied by developers, vendors, and so on.

In contrast to system data, at block 804, user data is stored in a second separation mechanism (or equivalently, a compartment). The user data includes data typically created by users: spreadsheets, word processing documents, Web pages, source code, and so on. This type of data is not easily re-creatable because it is typically unique to the user, so that when it gets lost or damaged, it cannot be replaced by developers or vendors since no copies of it typically exist.

At block 806, a computer system containing the two compartment of blocks 802 and 804, checks for any malware problems. Checking for malware could take a variety of forms: periodic checking, passively waiting until the moment that the anti-virus catches a piece of malware, etc. Alternatively, this step could be omitted altogether, and an assumption could be made that after some specified period of time or after some specified number of transactions, a computer system is likely to be infected with malware so that it's time to treat the system as if it is infected and thus any specified compartments with a partition must be disposed of.

At block 808, system data in the entire partition (so called "red partition") is disposed of (or "torched") by eliminating the data in the first compartment so that any malware infecting the partition is also extricated. As mentioned above, there may be a variety of triggers for such torching of a partition. They may include torching upon: (a) booting up of a system; (b) a timing event; (c) anti-virus software detecting a malware problem; (d) a user who panics and decides to push a "panic button" to torch an entire partition. Upon torching of a compartment within a partition, the system is disinfected of any malware, since torching can have the equivalent effect to formatting a compartment within a partition.

Finally, once a compartment has been torched, new system data can be installed (or re-installed) in the compartment. The new system data can take a variety of forms: from original system data that was first installed in the compartment to recent system data that was present right before any malware event that necessitated the torching of the compartment in the first place. Once the new system data is installed, it can continue to interact with the saved user that that has not been compromised.

Figure 9:
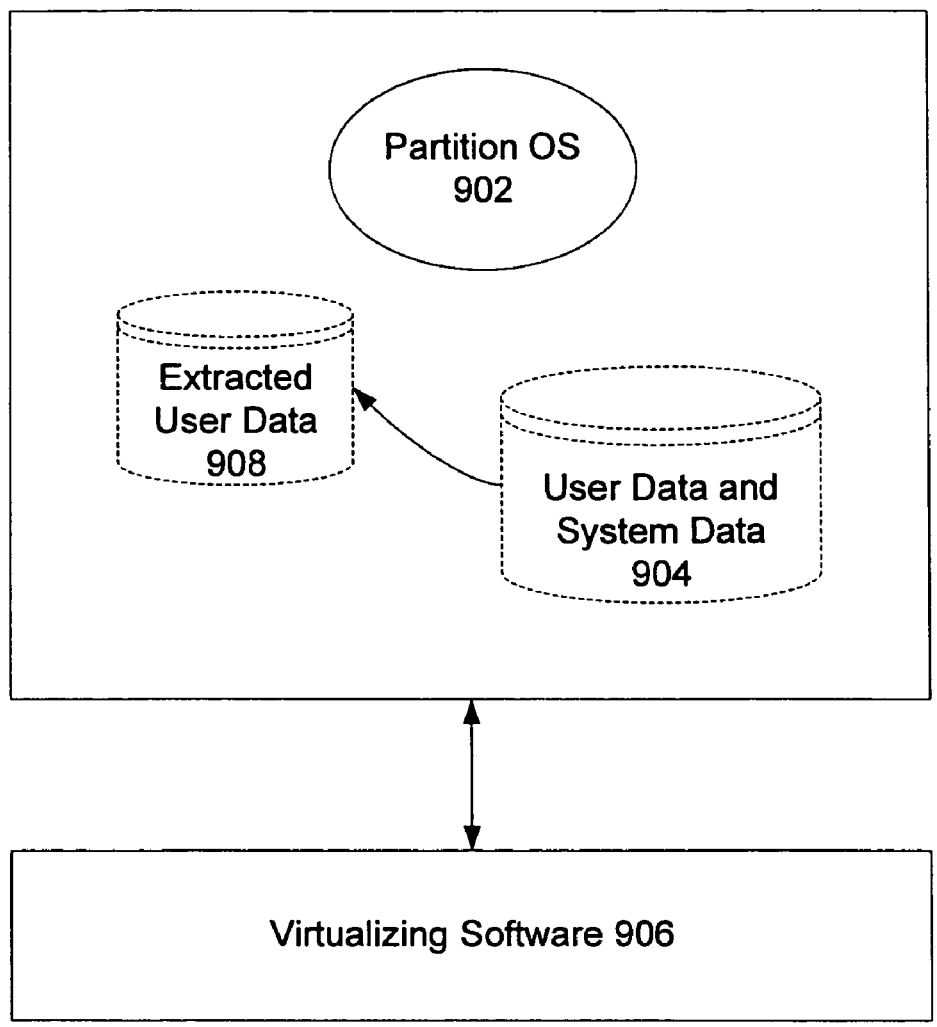
FIG. 9 illustrates the extraction of user data.

FIG. 9 illustrates the extraction of user data from a compartment. Thus, in FIG. 9, a system data and a user data are provided in a compartment 904 together. Next, the user data is extracted to another compartment 908 using an extraction mechanism appreciated by those skilled in the art. This extraction can be performed using tools that are able to migrate data from one computer system to another computer system. The remaining system data can be torched upon a specified event. Once the remaining system data is torched, the user data can be again repopulated in the compartment 904. Likewise, a new system data can be repopulated in the compartment 904. Moreover, the extracted user data 908 can be extracted beyond the partition 901 to another partition (not illustrated).

While the present invention has been described in connection with the preferred aspects, as illustrated in the various figures, it is understood that other similar aspects may be used or modifications and additions may be made to the described aspects for performing the same function of the present invention without deviating therefrom. For example, the separation of user data from system data was described, such that user data that is not easily re-creatable can be preserved and system data that is easily re-creatable can be disposed of based on a variety of events. However, other equivalent methods to these described aspects are also contemplated by the teachings herein. Therefore, the present invention should not be limited to any single aspect, but rather construed in breadth and scope in accordance with the appended claims.

What is claimed:

1. A method of protecting computer system integrity from infection by unauthorized software, comprising:

separating a system data from a user data, wherein the system data is separated from the user data according to a standard of difficulty of data re-creation;

storing the system data in a virtual system data compartment within a partition, wherein the system data stored in the virtual system data compartment is referred to as virtual system data;

storing the user data in a virtual user data compartment within the partition, wherein the user data stored in the virtual user data compartment is referred to as virtual user data;

wherein both the virtual system data and the virtual user data are accessible to an operating system in the partition;

automatically, by the operating system, disposing of all contents of the system data compartment based on a selected event comprising at least one of detection of infection by unauthorized software and a pre-emptive event to remove any potential infection by unauthorized software, wherein the disposing of all contents of the system data compartment includes one of rolling back and rolling forward the system data to a specified state; and storing a new system data in the virtual system data compartment, wherein the new system data stored in the virtual system data compartment is referred to as virtual new system data.

2. The method according to claim 1, wherein the standard of difficulty of data re-creation casts applications documents as user data.

3. The method according to claim 1, wherein the standard of difficulty of data re-creation casts executable files, dynamic link libraries, and configuration settings as system data.

4. The method according to claim 1, wherein an amount of the one of roll back and roll forward is determined by a differencing disk.

5. The method according to claim 1, wherein the pre-emptive event includes a boot-up of the computer system.

6. The method according to claim 1, wherein the pre-emptive event includes a timer event.

7. The method according to claim 1, wherein the pre-emptive event includes the pressing of a "panic button" by a user of the computer system.

8. The method according to claim 1, wherein the new system data is identical to the system data.

9. A system comprising a processor configured for disposing easily re-creatable data, comprising:
- a user data;
- a system data, wherein the system data is separated from the user data according to a standard of difficulty of data re-creation;
- a partition, wherein a virtualizing software virtualizes a virtual user data compartment to the partition, and wherein the virtualizing software virtualizes a virtual system data compartment to the partition;
- wherein the system data is stored in the virtual system data compartment in the partition and the user data is stored in the virtual user data compartment in the partition, wherein the system data stored in the virtual system data compartment is referred to as virtual system data and wherein the user data stored in the virtual user data compartment is referred to as virtual user data; and
- wherein, based on a selected event comprising at least one of detection of infection by unauthorized software and a pre-emptive event to remove any potential infection by unauthorized software, all contents of the system data compartment are automatically disposed of and a new system data is stored in the virtual system data compartment, wherein the new system data stored in the virtual system data compartment is referred to as virtual new system data, wherein disposing of all contents of the system data compartment includes one of rolling back and rolling forward the system data to a specified state.

10. The system according to claim 9, wherein the standard of difficulty of data re-creation casts applications documents as user data.

11. The system according to claim 9, wherein the standard of difficulty of data re-creation casts executable files, dynamic link libraries, and configuration settings as system data.

12. The system according to claim 9, wherein an amount of the one of roll back and roll forward is determined by a differencing disk.

13. The system according to claim 9, wherein the pre-emptive event includes a boot-up of the computer system.

14. The system according to claim 9, wherein the pre-emptive event includes a timer event.

15. The system according to claim 9, wherein the pre-emptive event includes the pressing of a "panic button" by a user of the computer system.

16. A computer storage medium bearing computer executable instructions configured to protect computer system integrity from infection by unauthorized software, comprising:
- separating a system data from a user data, wherein the system data is separated from the user data according to a standard of difficulty of data re-creation;
- storing the system data and the user data in a virtual data compartment within a partition in which there is an operating system, wherein the system data stored in the virtual data compartment is referred to as virtual system data and wherein the user data stored in the virtual data compartment is referred to as virtual user data;
- automatically, by the operating system, preserving the virtualized user data, disposing of all contents of the partition, and storing new system data in the partition based on a selected event comprising at least one of detection of infection by unauthorized software and a pre-emptive event to remove any potential infection by unauthorized software, wherein the disposing of all contents of the partition includes one of rolling back and rolling forward the system data to a specified state.

* * * * *